United States Patent
Yu et al.

(10) Patent No.: US 11,271,266 B2
(45) Date of Patent: Mar. 8, 2022

(54) BATTERY COMPRESSION INHIBITOR AND BATTERY MODULE COMPRISING SAME

(71) Applicant: LG ENERGY SOLUTION, LTD., Seoul (KR)

(72) Inventors: Seung-Sik Yu, Daejeon (KR); Sung-Jong Kim, Daejeon (KR); Tae-Sung Kim, Daejeon (KR); Jun-Yeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 810 days.

(21) Appl. No.: 15/531,934

(22) PCT Filed: Jan. 22, 2016

(86) PCT No.: PCT/KR2016/000737
§ 371 (c)(1),
(2) Date: May 31, 2017

(87) PCT Pub. No.: WO2016/148387
PCT Pub. Date: Sep. 22, 2016

(65) Prior Publication Data
US 2017/0331079 A1 Nov. 16, 2017

(30) Foreign Application Priority Data
Mar. 16, 2015 (KR) .................. 10-2015-0036088

(51) Int. Cl.
*H01M 50/138* (2021.01)
*H01M 50/24* (2021.01)
(Continued)

(52) U.S. Cl.
CPC ......... *H01M 50/138* (2021.01); *H01M 50/10* (2021.01); *H01M 50/20* (2021.01); *H01M 50/24* (2021.01); *H01M 50/557* (2021.01)

(58) Field of Classification Search
CPC .. H01M 2/025; H01M 2/1083; H01M 2/0212; H01M 2/0237; H01M 10/6557; H01M 10/65; H01M 2/1016
(Continued)

(56) References Cited

U.S. PATENT DOCUMENTS 8,114,539 B2   2/2012  Lee et al.
8,632,906 B2 *  1/2014  Yoshihara ........... H01M 2/1061
                                                    429/120
(Continued)

FOREIGN PATENT DOCUMENTS

EP   2 328 201 A1   6/2011
EP   2 669 917 A1  12/2013
(Continued)

OTHER PUBLICATIONS

Machine Translation in English of JP-2002141036. (Year: 2019).*
International Search Report for PCT/KR2016/000737 dated May 30, 2016.

*Primary Examiner* — Brian R Ohara
(74) *Attorney, Agent, or Firm* — Birch, Stewart, Kolasch & Birch, LLP

(57) ABSTRACT

The present invention provides a battery compression inhibitor and a battery module comprising the same, the battery compression inhibitor being suitable for preventing at least one battery assembly from being compressed by repeated application of an external force between end plates. The battery compression inhibitor according to the present invention comprises, in order to protect a battery assembly inside a battery module: a barrier positioned on the periphery of the battery assembly and exposed from the battery assembly; and a base plate exposed from the battery assembly and from the barrier below the battery assembly and below the barrier.

15 Claims, 6 Drawing Sheets

(51) Int. Cl.
*H01M 50/10* (2021.01)
*H01M 50/20* (2021.01)
*H01M 50/557* (2021.01)

(58) Field of Classification Search
USPC ......................................... 429/120, 162, 186
See application file for complete search history.

(56) References Cited

U.S. PATENT DOCUMENTS

| | | | |
|---|---|---|---|
| 8,734,979 B2 | 5/2014 | Kim | |
| 8,841,013 B2 | 9/2014 | Choo et al. | |
| 2001/0007728 A1* | 7/2001 | Ogata | H01M 10/647 |
| | | | 429/120 |
| 2006/0091856 A1* | 5/2006 | Lee | H01M 10/6563 |
| | | | 320/116 |
| 2007/0052390 A1* | 3/2007 | Kim | H01M 10/0413 |
| | | | 320/116 |
| 2008/0318119 A1* | 12/2008 | Watanabe | H01M 2/1016 |
| | | | 429/99 |
| 2012/0040226 A1* | 2/2012 | Kim | H01M 2/1077 |
| | | | 429/120 |
| 2012/0040229 A1 | 2/2012 | Zhu et al. | |
| 2012/0282506 A1 | 11/2012 | Hohenthanner et al. | |
| 2015/0349306 A1 | 12/2015 | Watanabe et al. | |

FOREIGN PATENT DOCUMENTS

| | | | |
|---|---|---|---|
| JP | H8-111244 A | | 4/1996 |
| JP | 2001-236937 A | | 8/2001 |
| JP | 2002141036 A | * | 5/2002 |
| JP | 2012-230832 A | | 11/2012 |
| JP | 2012-527082 A | | 11/2012 |
| JP | 2014-149940 A | | 8/2014 |
| JP | 2014-154509 A | | 8/2014 |
| KR | 10-0590050 B1 | | 6/2006 |
| KR | 10-0717753 B1 | | 5/2007 |
| KR | 10-2011-0080928 A | | 7/2011 |
| KR | 10-2011-0090708 A | | 8/2011 |
| KR | 10-2012-0007069 A | | 1/2012 |
| KR | 10-2012-0123946 A | | 11/2012 |
| KR | 10-2013-0080144 A | | 7/2013 |
| WO | WO 2011/089182 A1 | | 7/2011 |

* cited by examiner

FIG. 4

BATTERY COMPRESSION INHIBITOR AND BATTERY MODULE COMPRISING SAME

TECHNICAL FIELD

The present application claims the benefit of Korean Patent Application No. 10-2015-0036088 filed on Mar. 16, 2015 with the Korean Intellectual Property Office, the disclosure of which is incorporated herein by reference in its entirety.

The present disclosure relates to a battery compression inhibitor suitable for preventing direct delivery of an external force onto components when the external force is repeatedly applied to the components, and a battery module comprising the same.

BACKGROUND ART

Recently, vehicles are manufactured based on studies conducted to secure driving force using internal combustion engines and/or electric motors, in order to reduce air pollution from exhaust gas of vehicles. Accordingly, the vehicles have evolved in the order of hybrid vehicles, plug-in hybrid vehicles and electric vehicles. In this case, the hybrid vehicles and plug-in hybrid vehicles have an internal combustion engine, an electric motor and a battery pack, and the electric vehicles have an electric motor and a battery pack, but not an internal combustion engine.

Also, the battery pack has evolved together with hybrid vehicles, plug-in hybrid vehicles, and electric vehicles. The battery pack may be configured to be charged externally from the electric vehicle. The battery pack may include a battery module, and the battery module may include a base plate, a battery assembly, and end plates. The base plate may be positioned under the battery assembly and the end plates to have the battery assembly seated thereon. The battery assembly may include a battery cell and a cartridge between the end plates. The cartridge may be configured to receive the battery cell.

The end plates may be configured to surround the battery cell and the cartridge in a sandwich structure. The end plates may be coupled with the battery assembly and the base plate, thus fixing the battery assembly onto the base plate. In this case, when an external force is repeatedly applied between the end plates of the battery assembly, the battery assembly may be repeatedly compressed between the end plates while receiving and absorbing the external force. The repeated compression of the battery assembly may cause change in initial shapes of the battery cell and the cartridge and deterioration in charge and discharge of the battery cell.

In order to prevent the repeated compression of the battery assembly, many researches are conducted on the coupling relations of the battery assembly and the end plates. One example of such researches is disclosed in 'Battery pack comprising reinforce member' of Korean Patent Publication No. 10-2011-0090708 published on Aug. 10, 2011. The battery pack includes a battery module arrangement, the end plates and the base plate. The battery module arrangement includes two battery modules arranged in a certain direction.

The end plates may be respectively positioned on both side portions of the battery module arrangement in a direction of blocking a region between the battery modules. The base plates may be positioned under the battery module arrangement and the end plates. Further, the battery pack may additionally include main members, reinforce members, and supporting bars. The main members may be respectively fixed onto the end plates under the end plates. In this case, the main members surround the base plates.

The reinforce members may be respectively positioned on both side portions of the battery module arrangement in a direction vertical to a direction the end plates are arranged. The supporting bars may connect the end plates at an upper side portion of the battery module arrangement. However, when an external force is repeatedly applied to the battery module arrangement between the end plates, the battery module arrangement, the end plates, the main members, the reinforce members and the supporting bars may repeatedly move relatively to the base plate.

The repeated movement of the battery module arrangement may change initial shapes of the battery modules and lower electrical characteristics of the battery modules.

DISCLOSURE

Technical Problem

The present disclosure is designed to solve the problems of the related art, and therefore the present disclosure is directed to providing a battery compression inhibitor suitable for preventing repeated compression of battery assemblies under an external force, when the external force is repeatedly applied to the battery assemblies between the end plates, and a battery module comprising the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery compression inhibitor for protecting at least one battery assembly within a battery module, which may include a partition positioned on a periphery of the battery assembly, and a base plate positioned under the battery assembly and the partition, while being in a vertical relation with the partition, in which the partition may be extended toward side portions of the battery assembly so as to be exposed from the battery assembly, and the base plate may be exposed from the battery assembly and the partition so as to have the battery assembly and the partition seated thereon.

Preferably, the partition may be in contact with the battery assembly.

More preferably, the partition may be positioned in parallel with the battery assembly, and extended past an edge of the battery assembly, and toward both side portions and an upper side portion of the battery assembly.

In one aspect of the present disclosure, the partition may define hollow portions extended therein from one end to another end and stacked sequentially on one another.

In another aspect of the present disclosure, the partition may be formed in a panel shape, and have a greater width at an upper side than at a lower side.

Optionally, the partition may be formed in a panel shape, and have a same width at the lower side and the upper side.

In one aspect of the present disclosure, the base plate may be extended in all directions from the battery assembly and the partition.

Preferably, in the battery module, the base plate may be coupled with the battery assembly and the partition through end plates.

Meanwhile, the partition and the base plate may be comprised of a metal.

In one aspect of the present disclosure, there is provided a battery module including battery assemblies, partitions positioned between the battery assemblies, end plates configured to surround the battery assemblies and the partitions in a sandwich structure, and base plates positioned under the battery assemblies, the partitions and the end plates, in which the partition may have a greater size than the battery assembly or the end plate, and a bottom of the base plate may have a greater area than an area occupied by the battery assemblies, the partitions, and the end plates.

Preferably, the battery assembly may include battery cells and cartridges arranged along one direction while contacting the partitions, and the battery cells may be received in the cartridges.

In one aspect of the present disclosure, the partitions may be positioned in parallel with the battery assemblies, and respectively protruded from regions between the battery assemblies and exposed from the battery assemblies.

Preferably, the partitions may define hollow portions extended therein from one end to another end and stacked sequentially on one another.

In one aspect of the present disclosure, in the one direction, a thickness of the partition may be less than a thickness of the cartridge.

In another aspect of the present disclosure, the partitions may be respectively exposed from both ends of the cartridges in different sizes at a lower side and an upper side of the cartridges, in a direction vertical to the one direction.

Optionally, the partitions may be exposed from both ends of the cartridges in a same size at the lower side and the upper side of the cartridges, in a direction vertical to the one direction.

Meanwhile, each of the end plates may include a flange on an edge, the base plate may be screw-coupled with the flange through at least one screw member on a lower side of the end plate, and the end plates may be screw-coupled with the battery assemblies and the partitions by long bolts on an upper side.

Advantageous Effect

The present disclosure gives the following effects.

A battery compression inhibitor according to the present disclosure includes partitions comprised of a metal and protruded from regions between the battery assemblies, and a base plate comprised of a metal and exposed from the battery assemblies and the partitions under the battery assemblies and the partitions. Accordingly, when an external force is applied in a direction vertical to a direction in which the partitions are arranged, the battery compression inhibitor may prevent direct delivery of the external force to the battery assemblies.

A battery module according to the present disclosure may prevent compression of the battery assembly due to an external force in advance, with the partitions exposed from the battery assemblies between the end plates, and with the base plate where the end plates, the battery assemblies, and the partitions are seated securely enough.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

FIGS. 4 to 6 are brief views provided to explain a preparation method and an operating mechanism of the battery module of FIG. 1.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

In the embodiments disclosed hereinafter, a battery cell refers to a lithium secondary battery. The "lithium secondary battery" as used herein encompasses a secondary battery in which lithium ions act as operating ions and thereby inducing electrochemical reaction in a positive electrode and a negative electrode during charging and discharging. However, the present disclosure is obviously not limited to the types of batteries.

Figure 1:
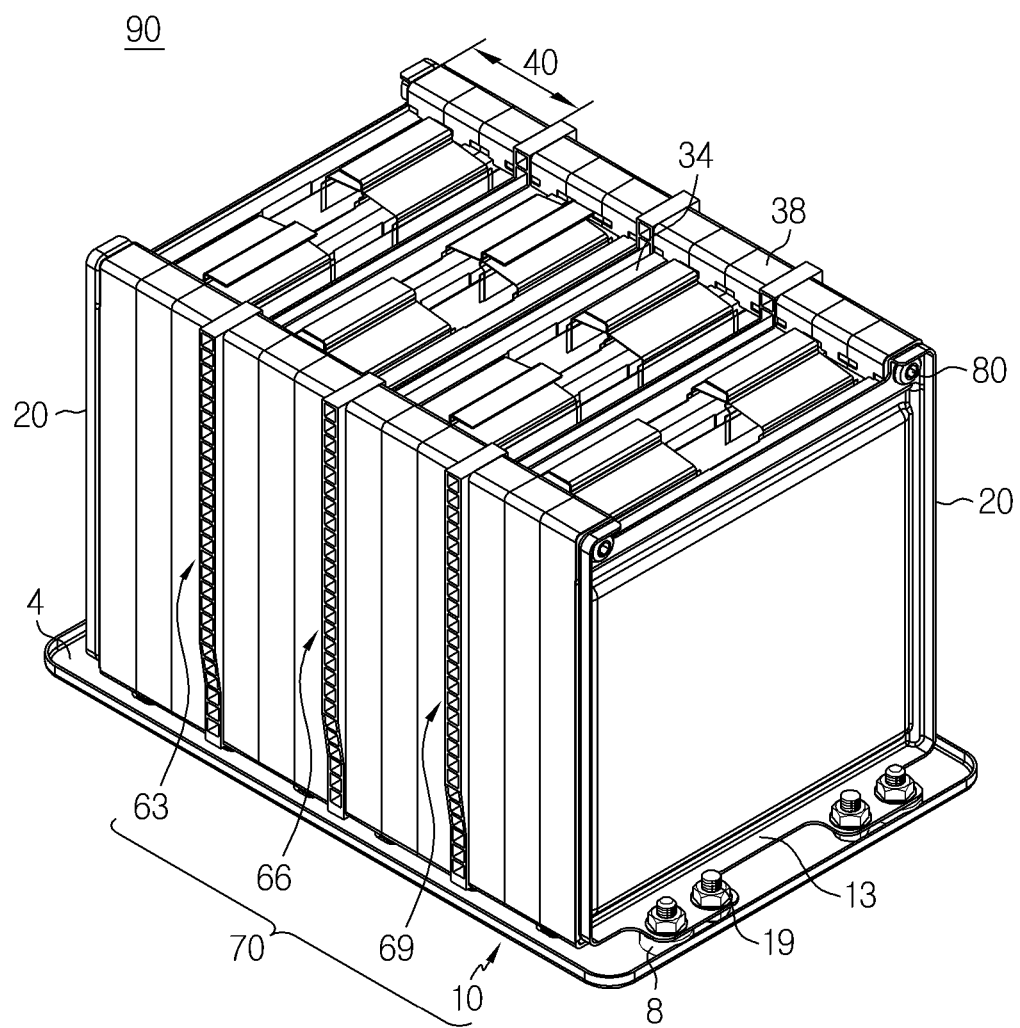
FIG. 1 is a perspective view illustrating a battery module according to an embodiment.

FIG. 1 is a perspective view illustrating a battery module according to an embodiment.

Referring to FIG. 1, the battery module 90 according to an embodiment includes a base plate 10, end plates 20, battery assemblies 40 and partitions 63, 66, 69. The base plate 10 may be positioned under the end plates 20, the battery assemblies 40 and the partitions 63, 66, 69, to have the end plates 20, the battery assemblies 40, and the partitions 63, 66, 69 seated thereon.

Preferably, a bottom 4 of the base plate 10 may be in contact with the end plates 20, the battery assemblies 40 and the partitions 63, 66, 69. The bottom 4 of the base plate 10 may have a greater area than an area occupied by the end plates 20, the battery assemblies 40 and the partitions 63, 66, 69 on the base plate 10. Preferably, the base plate 10 may be exposed from the battery assemblies 40, the end plates 20 and the partitions 63, 66, 69.

In one aspect of the present disclosure, the base plate 10 may be extended in all directions from the end plates 20, the battery assemblies 40 and the partitions 63, 66, 69. The base plate 10 may have upper screw members 8 on both edges facing each other. The base plate 10 may be comprised of a metal material. The end plates 20 may surround the battery assemblies in a sandwich structure.

Preferably, the end plate 20 may be comprised of a metal material. Each of the end plates 20 may have a flange 13 on an edge. Preferably, the flange 13 may be protruded from both ends and a lower end of the end plate 20. In one aspect of the present disclosure, the flange 13 may have a curved shape on the lower side of the end plate 20.

In another aspect of the present disclosure, the flange 13 may be screw-coupled with the base plate 10 by being inserted into upper screw members 8 of the base plate 10 on the lower side of the end plate 20. Each of the battery assemblies 40 may include battery cells 34 and cartridges 38 which are arranged along one direction. Preferably, the cartridge 38 may be configured to receive the battery cells 34.

Figure 5:
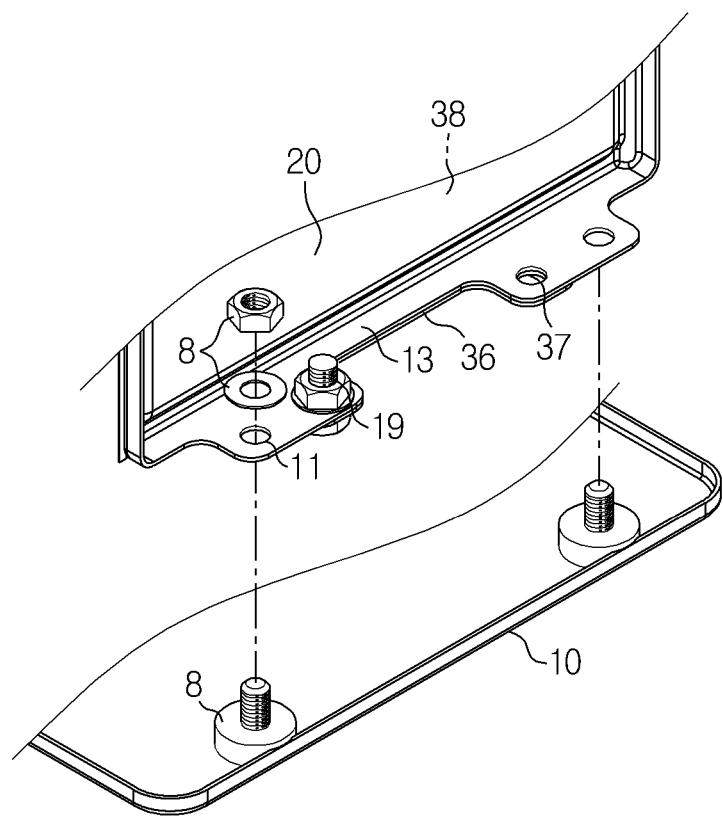

Each of the outermost cartridges 38 among the cartridges 38 may have a coupling plate 36 of FIG. 5 under the flange 13 on the lower side of the end plate 20. Preferably, the coupling plate 36 may be extended from the outermost cartridge 38 to an end of the flange 13. In one aspect of the present disclosure, the coupling plate 36 may be screw-coupled with the flange 13 through the upper screw members 19.

As illustrated, three cartridges 38 as one unit of cartridges may construct one battery assembly 40. However, the battery assembly 40 may be constructed with a unit of less than three cartridges or a unit of four or more cartridges 38. Meanwhile, the partitions 63, 66, 69 may be positioned between the battery assemblies 40. Preferably, the partitions 63, 66, 69 may have a greater size than the end plate 20 or the battery assembly 40.

In one aspect of the present disclosure, the partitions 63, 66, 69 may be extended toward side portions of the battery assembly 40 to be exposed from the battery assembly 40. In another aspect of the present disclosure, the partitions 63, 66, 69 may be positioned in parallel with the battery assembly 40 and extended past an edge of the battery assembly 40, toward both side portions and an upper side portion of the battery assembly 40.

More specifically, the partitions 63, 66, 69 may be positioned in parallel with the battery assemblies 40 and exposed from the battery assemblies by respectively protruded from regions between the battery assemblies 40. In this example, the partitions 63, 66, 69 may be comprised of a metal material. The partitions 63, 66, 69 together with the base plate 10 may construct a battery compression inhibitor 70.

On the base plate 10, the end plates 20, the battery assemblies 40, and the partitions 63, 66, 69 may be screw-coupled with an upper side of the end plates 20 by the long blots 80.

Figure 2:
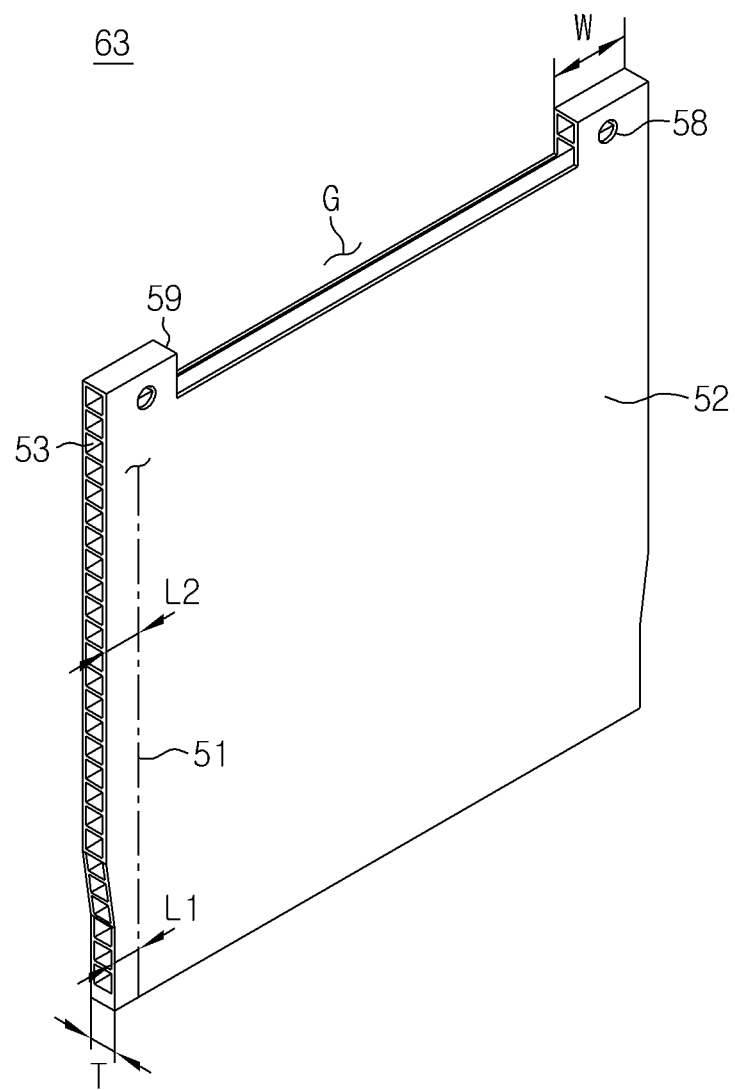
FIG. 2 is a perspective view magnifying and illustrating the partition of FIG. 1 in greater detail.

FIG. 2 is a perspective view magnifying and illustrating the partition of FIG. 1 in greater detail.

Referring to FIG. 2, the partition 63 may be formed in a panel shape having sidewalls 52 parallel to each other. Preferably, the sidewall 52 may have a flat surface. The partition 63 may have a greater width at an upper side than at a lower side. In this example, the partition 63 may define therein hollow portions 53 for example, which are extended therein from one end to the other end between the sidewalls 52 and stacked sequentially on one another.

Preferably, the hollow portions 53 of the partition 63 may reinforce the structure strength of the partition 63 and thus achieve light-weight of the partition 63 by serving a similar role as in an example of corrugated cardboard. The partition 63 may have a 凹-shape roughly. Preferably, the partition 63 may have projecting portions 59 defining a groove G on the upper side. The projecting portion 59 may have a certain width W, and may be protruded from regions between the cartridges of FIG. 1 on the upper side of the partition 63.

The projecting portion 59 may have a through hole 58 for inserting the long bolt 80 of FIG. 1. The partition 63 may be exposed on the lower side and the upper side of the cartridge 38, respectively in different sizes from both ends of the cartridge 38. More specifically, the partition 63 may be exposed on the lower side and the upper side of the cartridge 38, with different lengths L1, L2 from a dash and single dot line 51 of an end of the cartridge 38 in a direction vertical to one direction of FIG. 1 (arrangement direction of the battery cells 34 and the cartridges 38).

A thickness the partition 63 may be less than a thickness of the cartridge 38 in one direction. Meanwhile, a shape of the partition 63 may also be applied in the partitions 66, 69 of FIG. 1.

Figure 3:
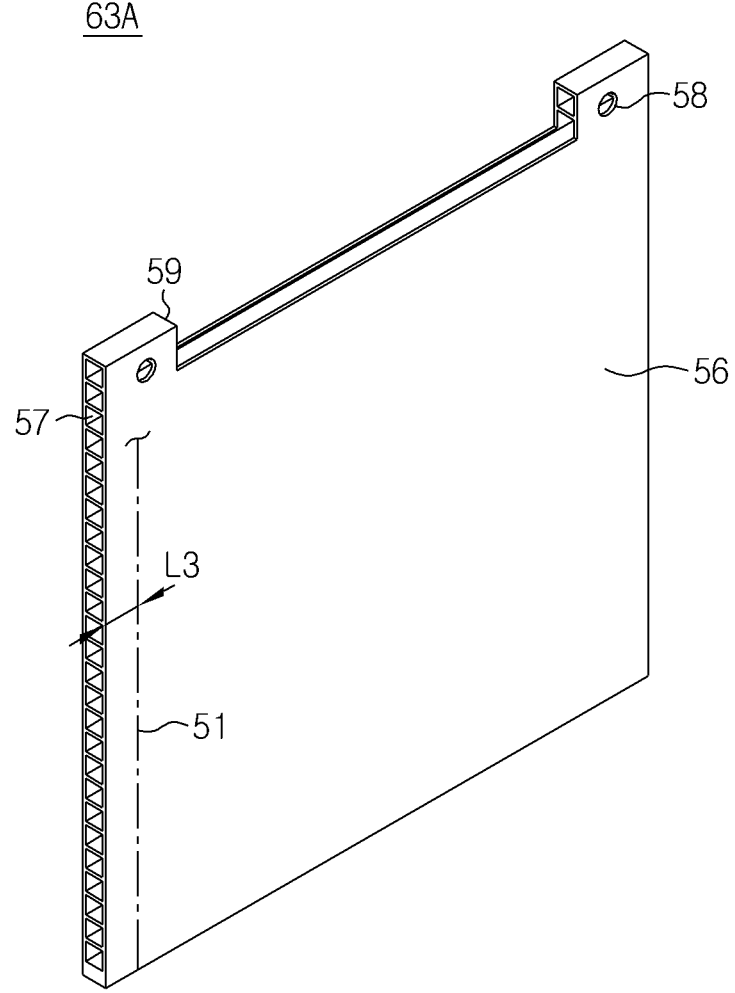
FIG. 3 is a perspective view provided to explain a modified example of the partition of FIG. 2.

FIG. 3 is a perspective view provided to explain a modified example of the partition of FIG. 2.

Referring to FIG. 3, the partition 63A according to the modified example of the present disclosure may have a similar shape to the partition 63 of FIG. 2. However, the partition 63A may have differences from the partition 63 as follows. That is, the partition 63A may have a 凹-shape. The partition 63A may be formed in a panel shape having the sidewalls 56 parallel to each other. The partition 63A may have the same width at the lower side and the upper side.

The partition 63A may define hollow portions 57 for example, which are extended therein from one end to the other end between the sidewalls 56 and stacked sequentially on one another. The partition 63A may be exposed in the same size from both ends of the cartridge 38, at the lower side and the upper side of the cartridge 38.

More specifically, the partition 63A may be exposed with the same length L3 at the lower side and the upper side of the cartridge 38, in a direction vertical to one direction of FIG. 1 (arrangement direction of the battery cells 34 and the cartridges 38) from the dash and single dot line 51 of the end of the cartridge 38. The length L3 may be equal to, or different from the length L2 of FIG. 2. Meanwhile, the partition 63A may substitute the partitions 63, 66, 69 of FIG. 1.

Figure 4:
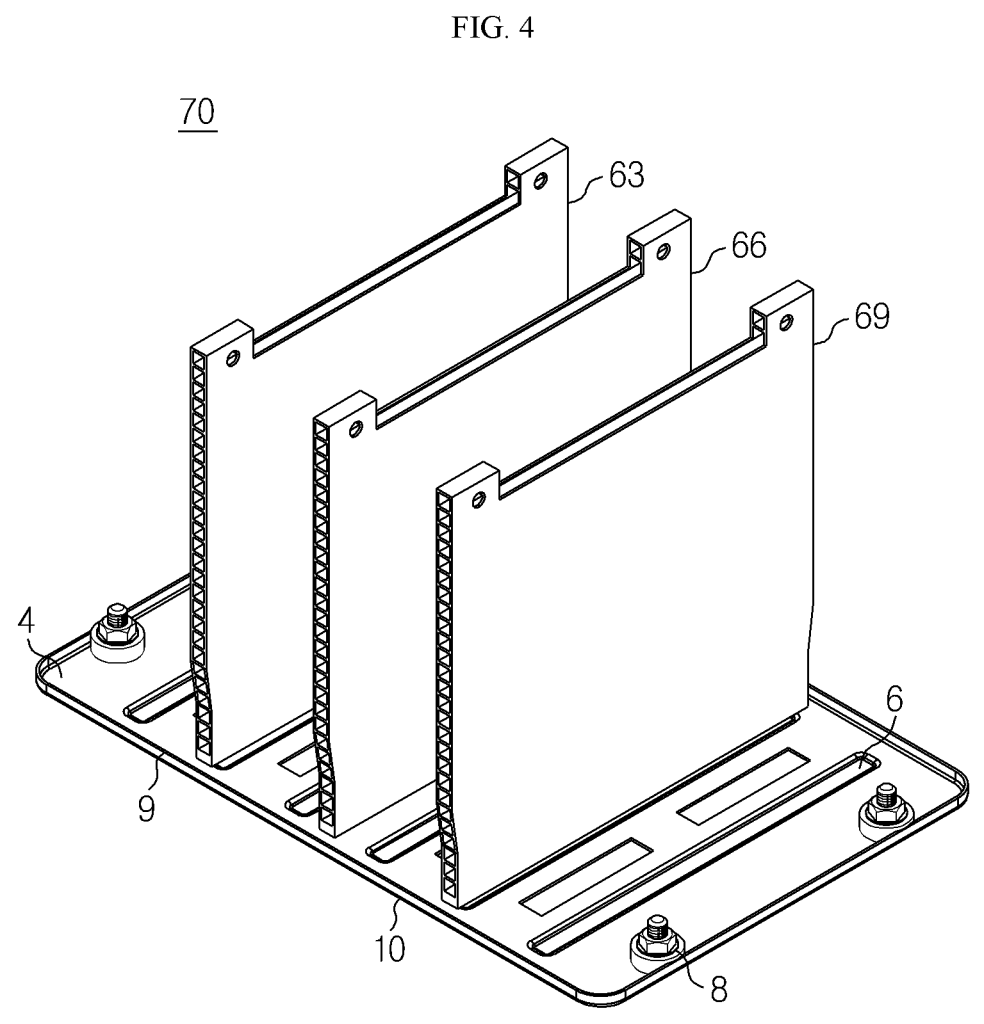
Figure 6:
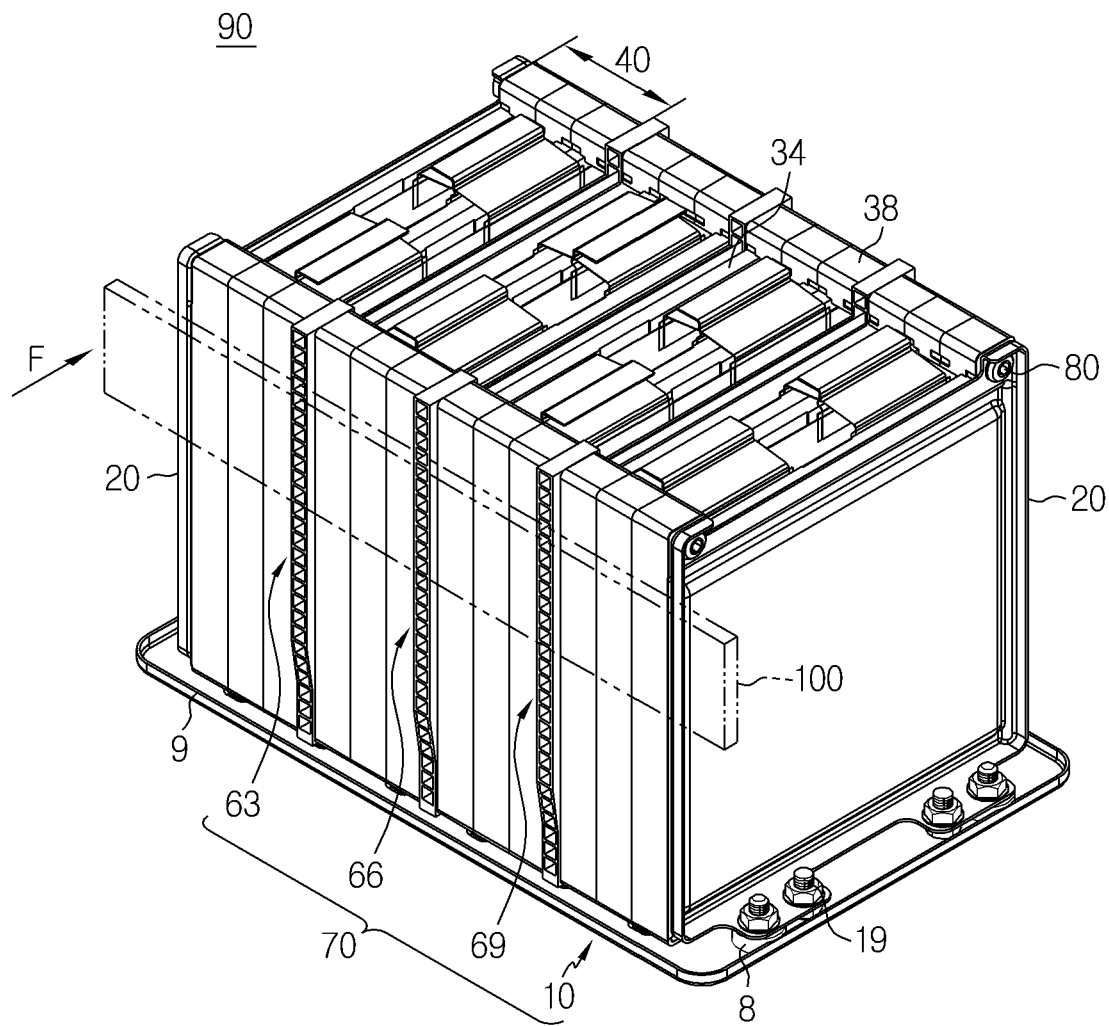

FIGS. 4 to 6 are brief views provided to explain a preparation method and an operating mechanism of the battery module of FIG. 1.

Referring to FIG. 4, the base plate 10 may be prepared. The base plate 10 may have a rectangular-bottom 4 and a buffer 9 surrounding the bottom 4. The bottom 4 may have a plurality of beads 6 between the lower screw members 8. Preferably, the bead 6 may have a groove on the bottom 4 and may be protruded to an outer circumference from the bottom 4.

The buffer 9 on the bottom 4 may surround the bottom 4 in a fence shape so as to protect the entire shape of the base plate 10. Further, the base plates 10 may include the lower screw members 8 on the bottom 4 on both edges. On the base plate 10, the end plates 20, the battery assemblies 40, and the partitions 63, 66, 69 may be disposed as illustrated in FIG. 1.

In this example, the base plate 10 and the partitions 63, 66, 69 may construct the battery compression inhibitor 70 as illustrated in FIG. 4. Preferably, in the battery compression inhibitor 70, the buffer 9 of the base plate 10 may sufficiently surround the partitions 63, 66, 69.

Referring to FIG. 5, the end plates 20 and the battery assemblies 40 may be overlapped on the periphery of the lower screw members 8 of the base plate 10. More specifically, each of the end plates 20 may have the flange 13 extended toward the lower screw members 8 of the base plate 10 from the lower side of the end plate 20. In the battery assemblies 40, each of the outermost cartridges 38 of FIG. 1 may have the coupling plate 36 extended toward the lower screw members 8 of the base plate 10 from the lower side of the cartridge 38.

Preferably, the coupling plate 36 may be positioned under the flange 13 on the periphery of the lower screw members 8. More preferably, the coupling plate 36 may be in contact with the flange 13 on a central region of the flange 13. In one aspect, the coupling plate 36 may have the same shape as the flange 13 at a central region of the flange 13. In this example, the flange 13 may have connection holes 11, and the coupling plate 36 may have coupling holes 37.

The connection holes 11 at both edges of the flange 13 may be aligned with the lower screw members 8 of the base plates 10. The flange 13 and the coupling plate 36 may be screw-coupled by inserting the upper screw members 19 into the connection holes 11 and the coupling holes 37 at the central region of the flange 13.

Referring to FIG. 6, the flange 13 and the coupling plate 36 may be screw-coupled by inserting the lower screw members 8 into the connection holes 11 at both edges of the flange 13. Next, the end plates 20, the battery assemblies 40, and the partitions 63, 66, 69 may be screw-coupled by the long bolts 80. As a result, the base plates 10, the end plates 20, the battery assemblies 40 and the partitions 63, 66, 69 may construct the battery module 90.

Next, the battery module 90 may be surrounded by a housing 100. In this example, the housing 100 is partially illustrated in order to briefly explain embodiments. Subsequently, when the housing 100 is repeatedly applied with the external force F from the upper side, the external force F may be delivered to a region between the end plates 20, and absorbed onto the housing 100, deforming the housing 100.

When the partitions 63, 66, 69 are not formed between the battery assemblies 40, the external force F may cause the housing 100 in the shape deformed from the initial shape to directly contact the battery assembly 40. More specifically, the deformed shape of the housing 100 may be brought into contact with the battery assemblies 40, thus causing the battery assemblies 40 to be moved relatively to the base plate 10 and the end plates 20.

Accordingly, the battery assemblies 40 may be repeatedly compressed and deformed between the end plates 20 correspondingly to the deformed shape of the housing 100. However, according to the present disclosure, the battery module 90 may have the partitions 63, 66, 69 between the battery assemblies 40 and between the end plates 20. The partitions 63, 66, 69 may protrude from the regions between the battery assemblies 40, as illustrated in FIGS. 1 and 2 and/or disclosed herein.

The partitions 63, 66, 69 may prevent the deformed shape of the housing 100 from a direct contact with the battery assemblies 40. Further, when the housing 100 is applied with the external force F from the lower side (not illustrated), since the base plate 10 is protruded from the end plates 20 and the partitions 63, 66, 69, the base plate 10 with the buffer 9 may prevent the deformed shape of the housing 100 from a direct contact with the battery assemblies 40.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A battery compression inhibitor for protecting at least one battery assembly within a battery module, comprising:
a battery assembly;
a partition positioned on a periphery of the battery assembly, the partition having a thickness; and
a base plate positioned under the battery assembly and the partition, while being in a horizontal relation with the partition,
wherein the partition is extended toward side portions of the battery assembly so as to be exposed from the battery assembly, and the base plate is exposed from the battery assembly and the partition so as to have the battery assembly and the partition seated thereon,
wherein a lip extends upwardly from a perimeter of the base plate,
wherein a width and a length of the base plate are greater than a width and the thickness of the partition, and
wherein the partition has a pair of sidewalls arranged parallel to each other and spaced apart by a distance equal to the thickness of the partition and hollow portions extending an entire height of the pair of spaced apart sidewalls so as to extend parallel to the pair of spaced apart side walls, the hollow portions extending the width of the partition, and stacked sequentially on one another.

2. The battery compression inhibitor of claim 1, wherein the partition is in contact with the battery assembly.

3. The battery compression inhibitor of claim 1, wherein the partition is positioned in parallel with the battery assembly, and extended past an edge of the battery assembly, and toward both side portions and an upper side portion of the battery assembly.

4. The battery compression inhibitor of claim 1, wherein the partition is formed in a panel shape, and has a greater width at an upper side than at a lower side.

5. The battery compression inhibitor of claim 1, wherein the partition is formed in a panel shape, and has a same width at the lower side and the upper side.

6. The battery compression inhibitor of claim 1, wherein the base plate is extended in all directions from the battery assembly and the partition.

7. The battery compression inhibitor of claim 1, wherein, in the battery module, the base plate is coupled with the battery assembly and the partition through end plates.

8. The battery compression inhibitor of claim 1, wherein the partition and the base plate are comprised of a metal.

9. A battery module, comprising:
battery assemblies;
partitions positioned between the battery assemblies, each partition having a thickness, the battery assemblies separated from each other by the thickness of the partitions;
end plates configured to surround the battery assemblies and the partitions in a sandwich structure; and
a base plate positioned under the battery assemblies, the partitions, and the end plates,
wherein each partition has a width greater than a width of one of the battery assemblies or one of the end plates, and a bottom of the base plate has a greater surface area than an area occupied by the battery assemblies, the partitions, and the end plates on the bottom of the base plate,
wherein a lip extends upwardly from a perimeter of the base plate, and
wherein each partition has a pair of spaced apart sidewalls arranged parallel to each other and spaced apart by a distance equal to the thickness of the partition, and hollow portions extending an entire height of the pair of spaced apart sidewalls so as to extend parallel to the pair of spaced apart side walls, the hollow portions extending the width of the partition, and stacked sequentially on one another.

10. The battery compression inhibitor of claim 9, wherein each battery assembly comprises battery cells and cartridges arranged along one direction while being in contact with the partitions, and the battery cells are received in the cartridges.

11. The battery compression inhibitor of claim 9, wherein the partitions are positioned in parallel with the battery assemblies, respectively protruded from regions between the battery assemblies, and exposed from the battery assemblies.

12. The battery compression inhibitor of claim 10, wherein, in the one direction, the thickness of each partition is less than a thickness of each cartridge.

13. The battery compression inhibitor of claim 10, wherein the partitions are respectively exposed from both ends of the cartridges in different sizes at a lower side and an upper side of the cartridges, in a direction vertical to the one direction.

14. The battery compression inhibitor of claim 10, wherein the partitions are exposed from both ends of the cartridges in a same size at the lower side and the upper side of the cartridges, in a direction vertical to the one direction.

15. The battery compression inhibitor of claim 9, wherein each of the end plates comprises a flange on an edge,
the base plate is screw-coupled with the flange through at least one screw member on the lower side of the end plate, and
the end plates are screw-coupled with the battery assemblies and the partitions by bolts extending through the battery assemblies and the partitions on the upper side.

* * * * *